(12) United States Patent
Bednasz

(10) Patent No.: US 7,408,886 B2
(45) Date of Patent: Aug. 5, 2008

(54) METHOD FOR PROVIDING MOBILE PHONE USER WITH ACCURATE CAPABILITY INDICATOR

(75) Inventor: Kenneth M. Bednasz, Raleigh, NC (US)

(73) Assignee: Sony Ericsson Mobile Communication AB, Lund (SE)

( * ) Notice: Subject to any disclaimer, the term of this patent is extended or adjusted under 35 U.S.C. 154(b) by 683 days.

(21) Appl. No.: 10/711,451

(22) Filed: Sep. 20, 2004

(65) Prior Publication Data

US 2006/0062149 A1    Mar. 23, 2006

(51) Int. Cl.
*H04L 12/26* (2006.01)
*H04Q 7/00* (2006.01)
*H04B 1/18* (2006.01)

(52) U.S. Cl. ............ 370/252; 370/332; 455/154.1
(58) Field of Classification Search ........... 455/421, 455/423, 67.7, 115.4, 154–160, 226.1–4, 455/154.1–160.1, 226.4; 370/331–333, 252
See application file for complete search history.

(56) References Cited

U.S. PATENT DOCUMENTS

| | | | |
|---|---|---|---|
| 5,613,213 A | | 3/1997 | Naddell et al. |
| 6,553,010 B1 | | 4/2003 | Jober |
| 6,668,159 B1 | * | 12/2003 | Olofsson et al. ......... 455/67.11 |
| 7,167,679 B2 | * | 1/2007 | Sano ..................... 455/41.2 |
| 2004/0166811 A1 | * | 8/2004 | Moon ..................... 455/67.11 |
| 2004/0170198 A1 | | 9/2004 | Meggers et al. |
| 2005/0113028 A1 | * | 5/2005 | Uchida et al. ............. 455/67.7 |

OTHER PUBLICATIONS

Sony Ericsson Mobile Communications AB, "International Application No. PCT/US05/011144" *International Search Report*, Jul. 1, 2005.
Sony Ericsson Mobile Communications AB, "International Application No. PCT/US05/011144" *Written Opinion*, Jul. 1, 2005.

* cited by examiner

*Primary Examiner*—Chi H. Pham
*Assistant Examiner*—Tri H Phan
(74) *Attorney, Agent, or Firm*—Dominic J. Chiantera; Moore & Van Allen, PLLC

(57) ABSTRACT

A software program in a mobile phone periodically checks the current network connection parameters and compares them to the minimum data throughput requirements of all applications loaded on the mobile phone. If the current parameters fall short of the required parameters for a given application, the mobile phone will shade that application out on the display indicating that the application will not execute at the moment. This saves the user from the frustration experienced in actually launching the application and waiting for the application to fail. If the current parameters meet or exceed the required parameters for a given application, the mobile phone will display that application normally indicating that the application can execute at the moment. If the mobile phone has a color display, the applications that cannot currently execute can be colored differently than applications that can currently execute.

7 Claims, 4 Drawing Sheets

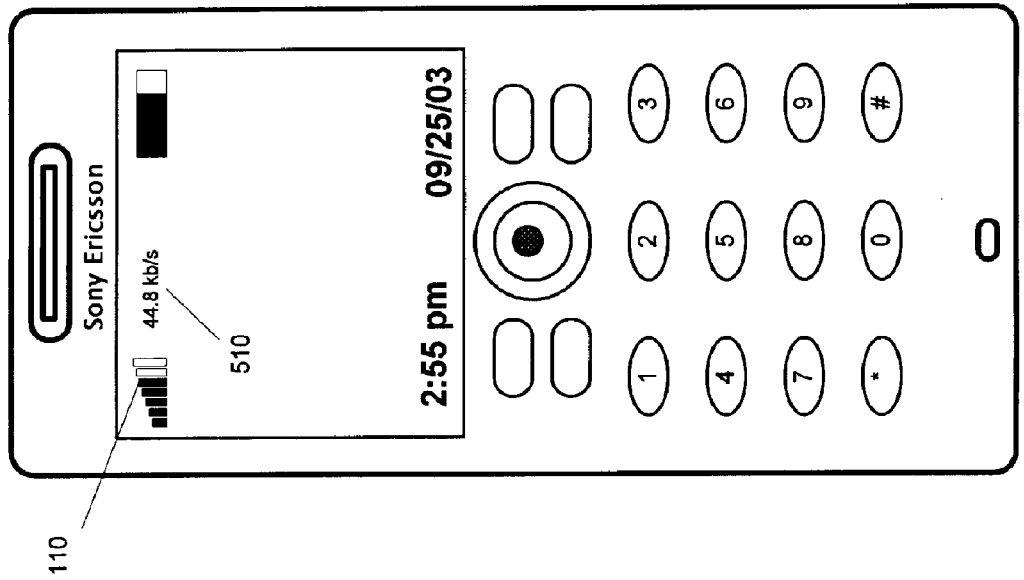
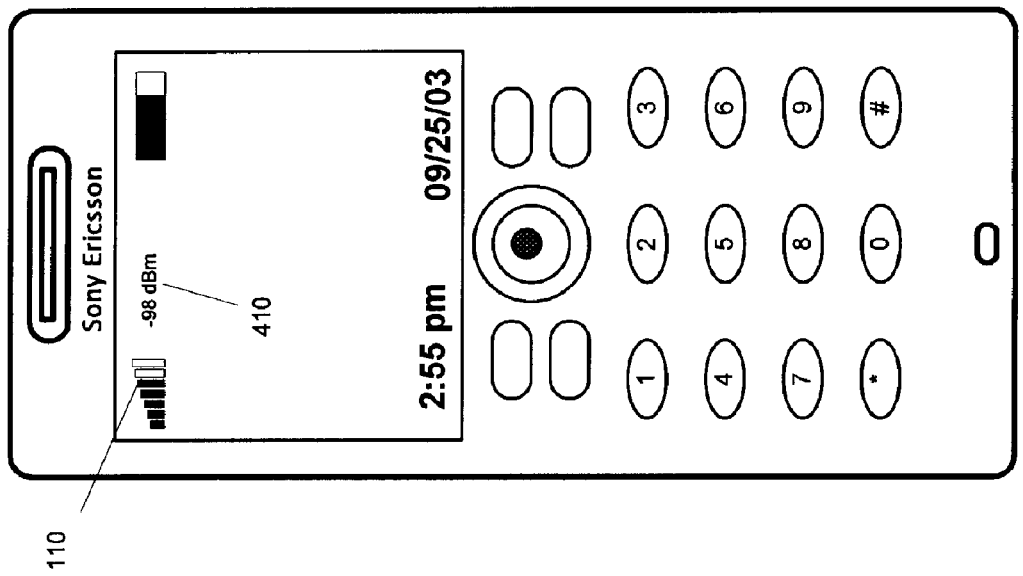

METHOD FOR PROVIDING MOBILE PHONE USER WITH ACCURATE CAPABILITY INDICATOR

BACKGROUND

Mobile phones do not always provide users with an accurate indicator of instantaneous network conditions especially as it pertains to launching and executing data applications that may require higher bandwidths for data throughput than standard voice communications to operate.

The only current signal strength indicator between a mobile phone and its network is a fixed received signal strength indicator (RSSI) scale that is based on the voice communications requirements of the mobile phone. Because the RSSI is based on voice requirements it cannot provide a reliable indication for mobile-to-network data applications that have more stringent data throughput requirements than voice communications.

For example, if a mobile application requiring a data rate that corresponds to −86 dBm is launched from a location having a −101 dBm signal between mobile and network, the RSSI will indicate sufficient signal strength to launch and execute the application. This may be true for voice communications, but is not true for the high speed data application if it has a higher minimum data rate requirement that needs a stronger RF signal strength than −101 dBm. As a result, the data application is likely to fail. This can frustrate and annoy the user since they have been provided misleading signal strength indications.

What is needed is a more reliable and accurate signal strength indicator that can be dynamically tailored to provide an indication whether any particular data application that communicates with the network can be executed from the mobile phone's current location.

SUMMARY

The present invention comprises a system and method for accurately indicating to a mobile phone user the current capabilities of the phone based on the current signal strength.

A software program in the mobile phone periodically checks the current network connection parameters and compares them to the minimum data throughput requirements of all applications loaded on the mobile phone.

If the current parameters fall short of the required parameters for a given application, the mobile phone will shade that application out on the display indicating that the application will not execute at the moment. This saves the user from the frustration experienced in actually launching the application and waiting for the application to fail. If the current parameters meet or exceed the required parameters for a given application, the mobile phone will display that application normally indicating that the application can execute at the moment. If the mobile phone has a color display, the applications that cannot currently execute can be colored differently than applications that can currently execute.

BRIEF DESCRIPTION OF THE DRAWINGS

FIGS. 4 and 5 illustrate a mobile phone with data based signal strength icons shown in the display area.

DETAILED DESCRIPTION

Figure 1:
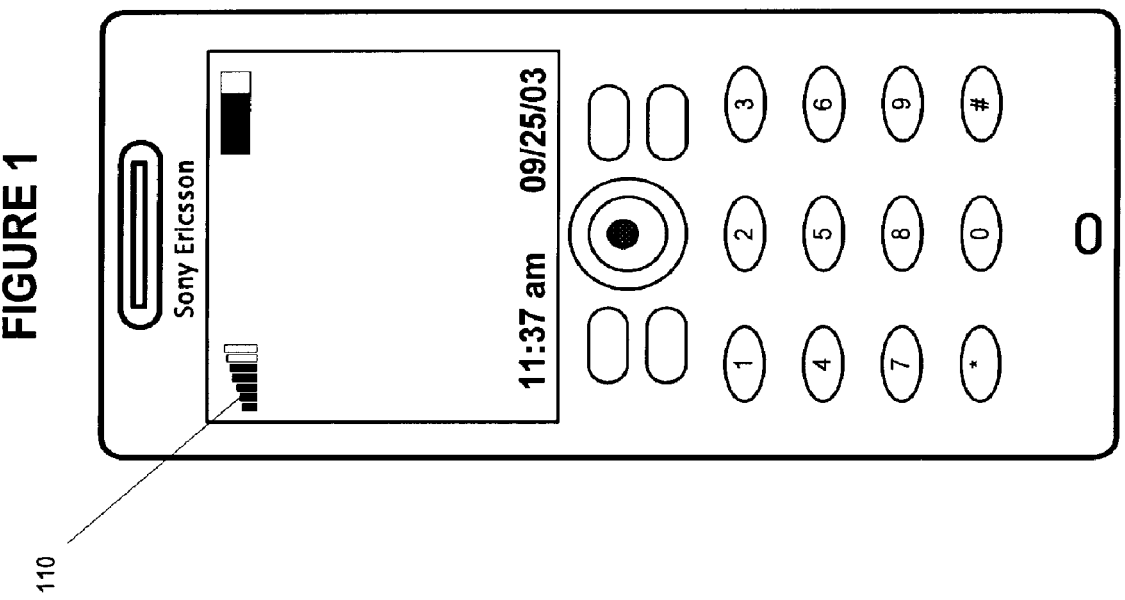
FIG. 1 illustrates a typical mobile phone with a voice communications signal strength indicator shown on the display.

FIG. 1 illustrates a typical mobile phone with a voice communications signal strength indicator 110 shown on the display. This is the typical display that a user encounters when operating a mobile phone. The voice communication signal strength indicator 110 or voice communication RSSI provides the user with a visual cue as to whether a voice call will be successful at the given moment. The fewer the number of shaded bars, the weaker the signal strength. A complete absence of bars indicates that there is currently no signal between the mobile phone and the network.

As stated earlier, this RSSI is directed to current voice capability and the signal strength needed to conduct a voice call over the network. The signal strength and bandwidth requirements for voice communications are generally less restrictive than the requirements for data applications. Thus, the RSSI does not provide a reliable and accurate indication of whether a data application will be able to execute.

The invention is designed to operate as an early warning system to let the user know if a particular application they wish to execute will be able to execute. In this mode, the user navigates through his mobile phone menu structure (or "hot" keys) to launch a particular application. The application could be an e-mail (with or without attachments), SMS, MMS, or a networked game, etc. . . . Each application will have a different data bandwidth requirement for satisfactory execution. For instance, a text SMS will have a lower bandwidth requirement than playing a graphics intensive game over the cellular network.

A software program in the mobile phone periodically checks the current network connection parameters and compares them to the minimum data throughput requirements of all applications loaded on the mobile phone. Network connection parameters refer to the bandwidth currently available for data communications between the mobile phone and the network. The bandwidth of the network is the ability of the network to allocate network resources to a specific mobile phone. The amount of resources the network allocates can be based around the current network conditions (ex. current capacity vs. maximum capacity). The actual bandwidth of the network that is available to the mobile phone is dependent on different types of parameters that can be technology specific. Some of the parameters include time slots, codes, channels.

Time slots are used in the Global System for Mobile communications (GSM) or Time-Division-Multiple-Access (TDMA) wireless networks. If a mobile phone can be or is assigned more then one time slot the mobile phone's data rate could increase by the multiple of the available time slots (since more time slots are used more data can be sent).

Codes are used in Code-Division-Multiple-Access (CDMA) networks (ex. Walsh codes) to send data. The length of the code or number of codes determines the data rate of the mobile phone. Shorter codes require fewer less resources to send data resulting in a higher data rate. Another way to view this is to assign a mobile phone multiple codes to increase the data rate.

'Channels' is a generic term for communication systems and implies a method for transferring data from one point to another point. Addition of channels to increase data rate could be additional time slots in TDMA, or additional codes in CDMA, or the addition of actual frequency or spectrum to the network itself to increase data rates.

If the current parameters fall short of the required parameters for a given application, the mobile phone will shade that application out on the display indicating that the application will not execute at the moment. This saves the user from the frustration experienced in actually launching the application and waiting for the application to fail. If the current parameters meet or exceed the required parameters for a given application, the mobile phone will display that application normally indicating that the application can execute at the moment. If the mobile phone has a color display, the applications that cannot currently execute can be colored red rather than being shaded out. Similarly, the applications that can currently execute can be colored green.

Figure 2:
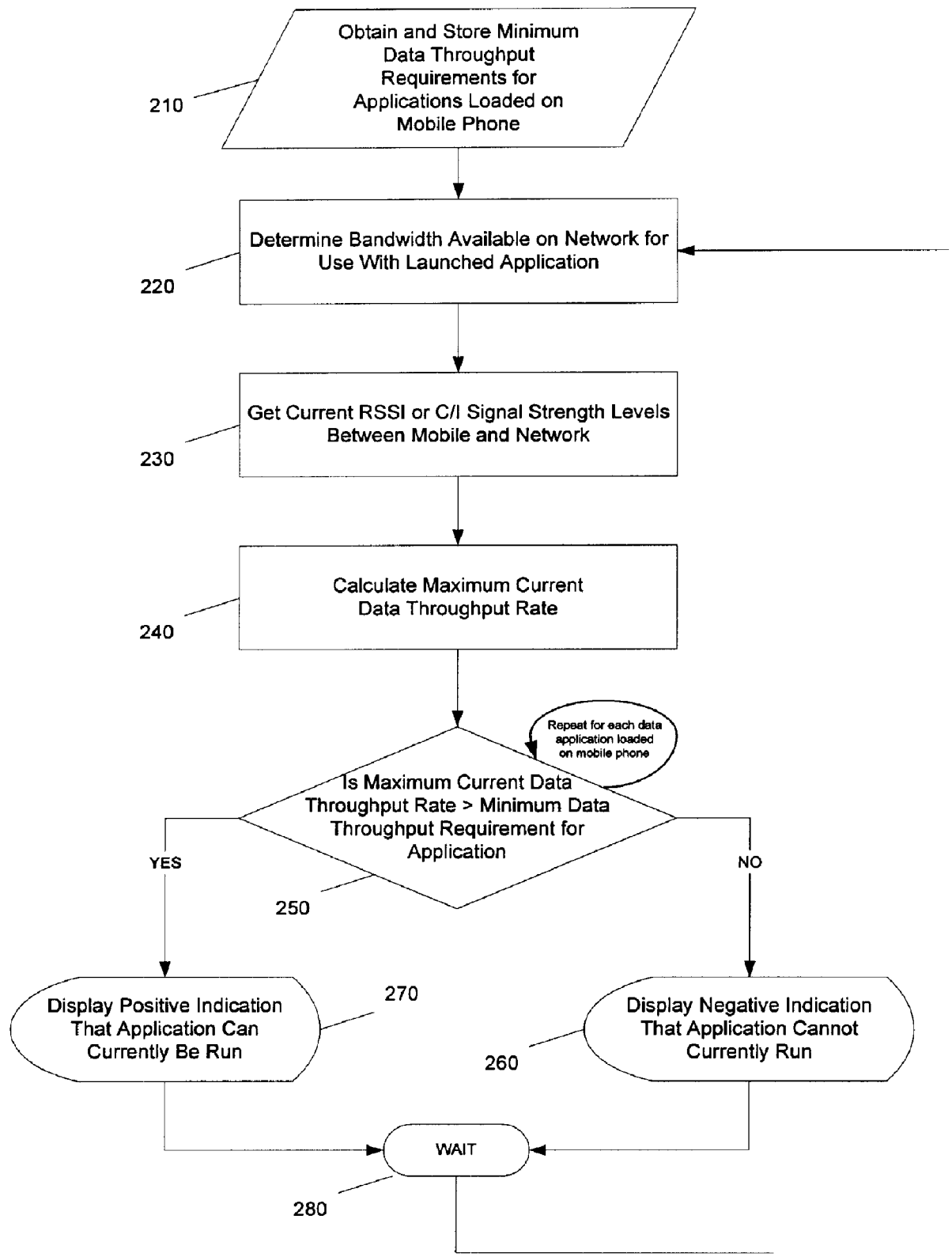
FIG. 2 is a flowchart illustrating the process of determining a dynamic signal strength indicator for a mobile phone.

FIG. 2 is a flowchart detailing the steps taken by the mobile phone to obtain and present a more reliable and dynamic RSSI that is geared for higher bandwidth data applications. The first step is a data gathering step and requires the mobile to obtain and store the minimum data throughput requirements for each application loaded on the mobile phone 210. The minimum data throughput requirements of the applications can be set by the phone or by the network.

The present invention includes an application that continually runs in the background. Its job is to monitor current network conditions. This background application periodically determines the bandwidth currently available on the network 220 and obtains the current receive strength signal indicator (RSSI) or C/I signal strength levels between the mobile phone and the network 230. With these values, the application then calculates the maximum possible current data throughput rate 240. The application then compares the maximum current data throughput rate with the minimum data throughput required by each mobile application 250. If the minimum data throughput requirement is greater than the maximum current data rate, the application will be unable to properly function, and a negative indicator 260 that the application cannot currently be run will be displayed to the user. If the maximum current data throughput rate is higher than the minimum data throughput requirement for a given application, the mobile phone will display a positive indicator 270 that the application at issue can currently be run. Steps 250, 260, and 270 are repeated for each application loaded on the mobile phone. When this is complete, the application goes to a wait state 280 until the period for the next check of network conditions arrives. Control is returned to step 220 and the entire process repeats. The period between network condition checks can be configured by the user or have a default value set in the mobile phone. The end result is a dynamic data RSSI that allows the user to quickly and accurately determine if a particular data application can execute at the current time.

Figure 3:
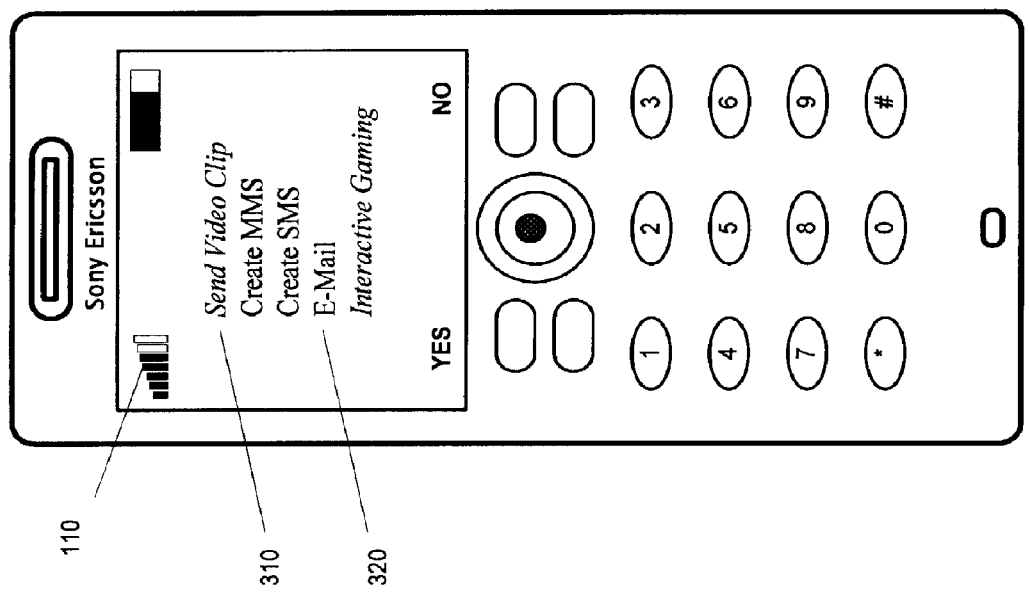
FIG. 3 illustrates a mobile phone displaying signal strength indicators with respect to a list of data applications.

FIGS. 3-5 detail some of the formats that the positive and negative indicators can take on the display of the mobile phone.

FIG. 3 illustrates a mobile phone with a sample menu being displayed. Some of the applications appear shaded out (italics) 310 indicating that they cannot currently be executed based on current network conditions. Applications that are displayed normally 320 can currently be executed.

The software program can also cause the display to show a dynamic data RSSI icon similar to the conventional voice communication RSSI 110. This is shown in FIGS. 4 and 5. In FIG. 4, a signal strength level measured in dBm 410 is placed just to the right of the voice communication RSSI 110. In FIG. 5, a signal strength level measured in kbits/s 510 is placed just to the right of the voice communication RSSI 110.

Users having a working knowledge of the data requirements for a particular application can simply glance at the mobile phone display and know if an application will execute saving them the trouble of navigating the menu to see if the application is shaded out or displayed in an 'off' color.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. A method of providing a data capability indication on a mobile phone that notifies a user as to whether or not a particular data application on the mobile phone can currently be executed on the mobile phone network, the method comprising:

(a) obtaining a minimum data throughput requirement for the application;

(b) calculating a current maximum data throughput rate between the mobile phone and the mobile phone network;

(c) determining whether the current data throughput rate is greater than the minimum data throughput requirement of the application;

(d) displaying a positive indicator on the mobile phone that the application can currently be run, if the current data throughput rate is greater than or equal to the minimum data throughput requirement of the application;

(e) displaying a negative indicator on the mobile phone that the application cannot currently be run, if the current data throughput rate is less than the minimum data throughput requirement of the application.

2. The method of claim 1 wherein steps (b) through (e) are repeated periodically to obtain and apply the current maximum data throughput rate between the mobile phone and the mobile phone network.

3. The method of claim 2 wherein the positive indicator appears as the application displayed normally by the mobile phone.

4. The method of claim 2 wherein the negative indicator appears as the application shaded out on the display of the mobile phone.

5. The method of claim 2 wherein the positive indicator appears as the application in a first color on the display of the mobile phone and the negative indicator appears as the application in a second different color on the display of the mobile phone.

6. The method in claim 2 further comprising displaying a current dBm level icon corresponding to the current maximum data throughput rate.

7. The method in claim 2 further comprising displaying a current data throughput rate icon expressed in bits per second corresponding to the current maximum data throughput rate.

* * * * *